United States Patent [19]

Osborn et al.

[11] 4,335,578

[45] Jun. 22, 1982

[54] SOLAR POWER CONVERTER WITH POOL BOILING RECEIVER AND INTEGRAL HEAT EXCHANGER

[75] Inventors: Douglas B. Osborn; Robert L. Pons, both of Mission Viejo, Calif.

[73] Assignee: Ford Aerospace & Communications Corporation, Detroit, Mich.

[21] Appl. No.: 154,723

[22] Filed: May 30, 1980

[51] Int. Cl.³ ............................................. F03G 7/02
[52] U.S. Cl. ................................ 60/641.8; 126/418; 126/433; 126/439
[58] Field of Search ............. 60/641.8, 641.15, 641.11; 126/418, 419, 421, 433, 434, 435, 439, 441

[56] References Cited

U.S. PATENT DOCUMENTS

| | | | |
|---|---|---|---|
| 1,969,839 | 8/1934 | Goddard | 126/439 |
| 4,033,118 | 7/1977 | Powell | 126/439 X |
| 4,068,474 | 1/1978 | Dimitrof | 60/641.15 |
| 4,222,367 | 9/1980 | Jubb | 126/419 |
| 4,252,107 | 2/1981 | Horton | 126/433 X |
| 4,285,333 | 8/1981 | Tanaka et al. | 126/433 |

Primary Examiner—Allen M. Ostrager
Assistant Examiner—Stephen F. Husar
Attorney, Agent, or Firm—Edward J. Radlo; Clifford L. Sadler; Robert D. Sanborn

[57] ABSTRACT

A solar converter is disclosed which has particular applicability at the focal point of a parabolic concentrator. The converter absorbs solar thermal radiation in a cavity type receiver and transports the heat via a secondary fluid to a heat exchanger which contains a primary (i.e., working) fluid used for process heating or to power a heat engine employing either Stirling, Rankine, or Brayton thermodynamic cycles. The secondary fluid is boiled within the receiver by the trapped solar radiation and the released vapor rises along an elevated path to the heat exchanger. The vapor condenses on the surfaces of the heat exchanger, thereby transferring heat to the engine working fluid. The condensed liquid then flows by means of gravity back to the solar receiver. The walls of the cavity receiver are typically comprised of two concentric cylinders joined at one end in a half toroid and at the other end in concentric half spheres. Optimum primary and secondary fluids, which may be different from each other and are different for different applications, are described.

10 Claims, 3 Drawing Figures

SOLAR POWER CONVERTER WITH POOL BOILING RECEIVER AND INTEGRAL HEAT EXCHANGER

BACKGROUND OF THE INVENTION

1. Field of the Invention

This invention is a solar power converter comprising a solar receiver and a heat exchanger. The device collects concentrated solar radiation in the form of heat and transports same to a device which may effectively utilize it, such as a heat engine, via a fluid which changes state at the solar receiver and again at the heat exchanger.

2. Description of the Prior Art

U.S. Pat. No. 4,116,222 shows a solar energy collection system having a reservoir which in some sense may be considered to be a heat exchanger. Unlike the present invention, (1) the heat exchanger has a third fluid, used mainly for storage purposes, which results in energy loss; (2) the patent utilizes forced convection (i.e., a pump) to move its secondary fluid; and (3) the secondary fluid does not change state from a liquid to a gas.

U.S. Pat. No. 4,003,367 is a water-to-water solar heater. The secondary water (that which is heated by the sun), is not vaporized as in the present invention; it is moved through the system by means of the principle that heat rises, setting up a current in the water.

U.S. Pat. No. 4,083,490 is a solar heating system utilizing a reservoir 40 which contains water or other secondary fluid. Unlike the present invention, there is no phase change in the secondary fluid.

U.S. Pat. No. 3,951,204 is not a solar energy collector. It is a heat pipe without a wick. It transfers heat from a high elevation to a low elevation (opposite direction to that in the present invention) and does not convert heat from one fluid to another as in the present invention.

U.S. Pat. No. 3,603,101 is a thermosyphon which does not teach a solar application. It converts a fluid from a liquid to a gas.

U.S. Pat. No. 3,482,625 is a non-solar system which bubbles Freon (TM) into water. It discloses a heat exchanger having cooling coils surrounded by a liquid through which a gas is bubbled.

U.S. Pat. Nos. 4,111,184 and 3,998,206 show solar receivers not having heat exchangers; U.S. Pat. No. 4,135,367 is a heat pipe having a wick; U.S. Pat. Nos. 3,563,305 and 1,922,509 are secondary references.

SUMMARY OF THE INVENTION

The present invention is a novel solar power converter comprised of a solar receiver coupled to a heat exchanger. The receiver is a double-walled vessel shaped in the form of a cylindrical cavity which is designed for efficient entrapment of concentrated solar energy. The deposited solar energy is distributed along the inner (cavity) surface of the receiver and heat is transferred through the wall to a (secondary) fluid kept in a boiling liquid pool within the sealed annular spaces of the vessel.

The secondary fluid is vaporized at a rate which is proportional to the net entrapped solar flux and commensurate with the thermophysical properties of this fluid, e.g., vapor pressure, temperature and latent heat of vaporization. The secondary fluid vapor rises by free convection forces through a pipe to a heat exchanger which is mounted above the level of the boiling liquid pool in the receiver. The vapor condenses on the surfaces of the heat exchanger and transfers heat to a primary fluid circulating through the heat exchanger. This primary fluid can be used directly in an industrial process heat application or it can be used as the working fluid in a heat engine, employing either the Stirling, Rankine or Brayton thermodynamic cycles. In either case the primary fluid flow rate is adjusted by means of a simple temperature control, to remove energy from the heat exchanger at the same rate as that of the incoming solar radiation trapped within the receiver. By this means both the primary and secondary working fluids are held at constant temperature despite wide variations in solar intensity as a function of time.

After condensing on the heat exchanger surfaces, the secondary fluid returns in liquid form, by gravity, to the boiling pool within the receiver to repeat the energy exchange process. In undergoing phase change, the secondary fluid transfers heat at very high rates at nearly constant temperature, thereby minimizing energy loss between the receiver and the heat exchanger. In addition, the very high heat transfer rate and correspondingly low wall/fluid temperature differences usually associated with boiling permit a high safety factor when compared with the peak solar flux typically experienced in cavity receivers. This means that large spatial and/or temporal variations in solar flux result in only small changes in wall temperatures. The high heat transfer rates additionally result in less required surface area with the concomitant benefit of compactness, low weight and low cost. Also, the basic design concept effectively uncouples the receiver from the energy conversion device, i.e., the two fluids can be separately optimized for maximum overall performance. The receiver functions entirely passively, i.e., without the use of pumps to circulate the secondary fluid. Lastly, the thermal capacitance of the boiling pool provides an inherent buffer thermal storage, which, e.g., permits engine operation during short periods of cloud cover or inclement weather.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENTS

Figure 1:
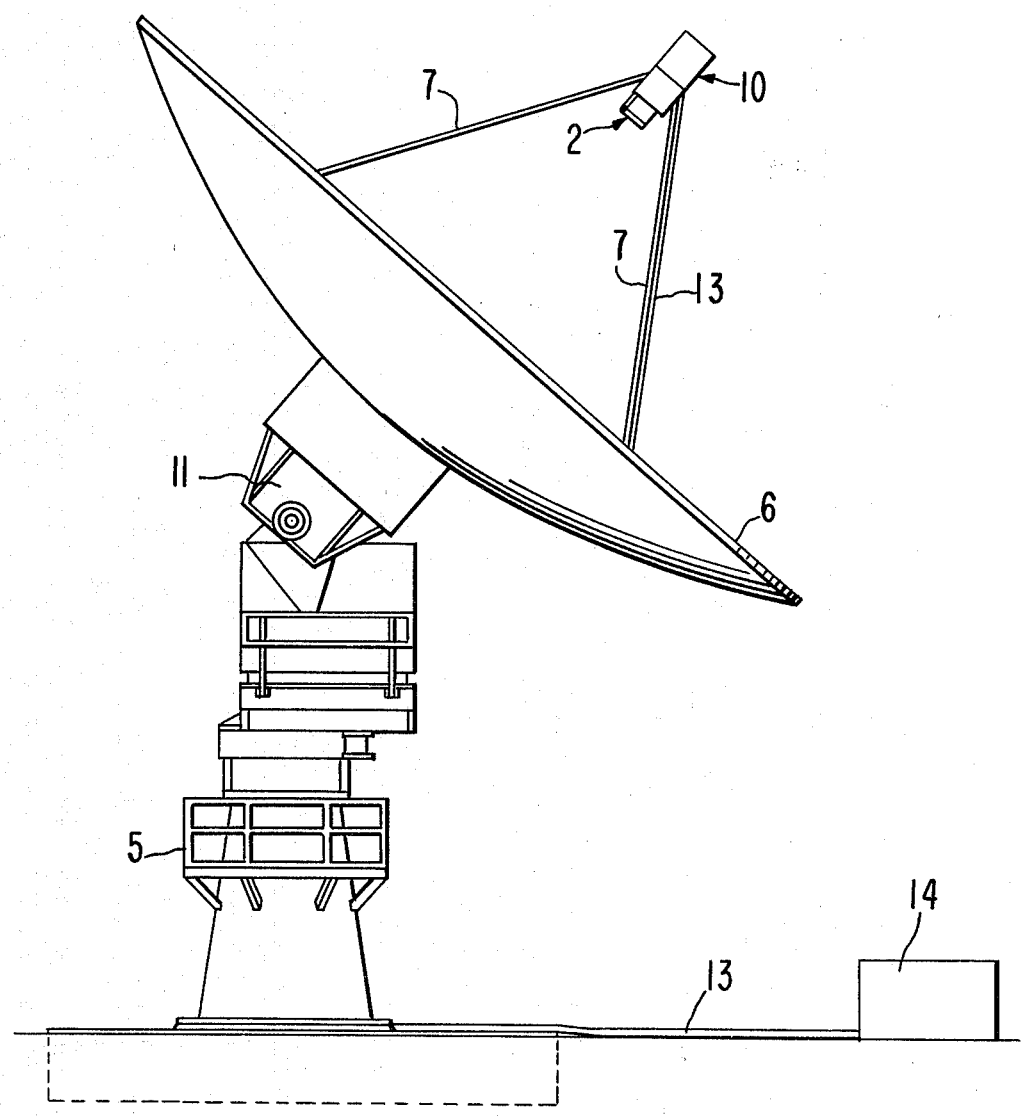
FIG. 1 is a schematic illustration of the invention in a typical environment at the focal point of a parabolic dish concentrator.

FIG. 1 shows the invention in a typical environment at the focal point of a parabolic dish concentrator 6 having a reflective surface which focuses the radiation from the sun 12 into the solar receiver 2. Alternatively, other means to concentrate the sun's rays such as a Fresnel lens or reflector can be employed in lieu of dish 6. The parabolic dish concentrator 6 is mounted above the ground by suitable support means such as steel and concrete base 5. A pivoting mechanism 11 allows the dish to move freely through, preferably, 360° of azimuth and 90° of elevation. Solar receiver 2 is constrained to move with dish 6 by appropriate mounting means such as rigid support bracket 7 which provides for a fixed relationship between receiver 2 and dish 6 while blocking only a small portion of the radiation from sun 12.

Figure 3:
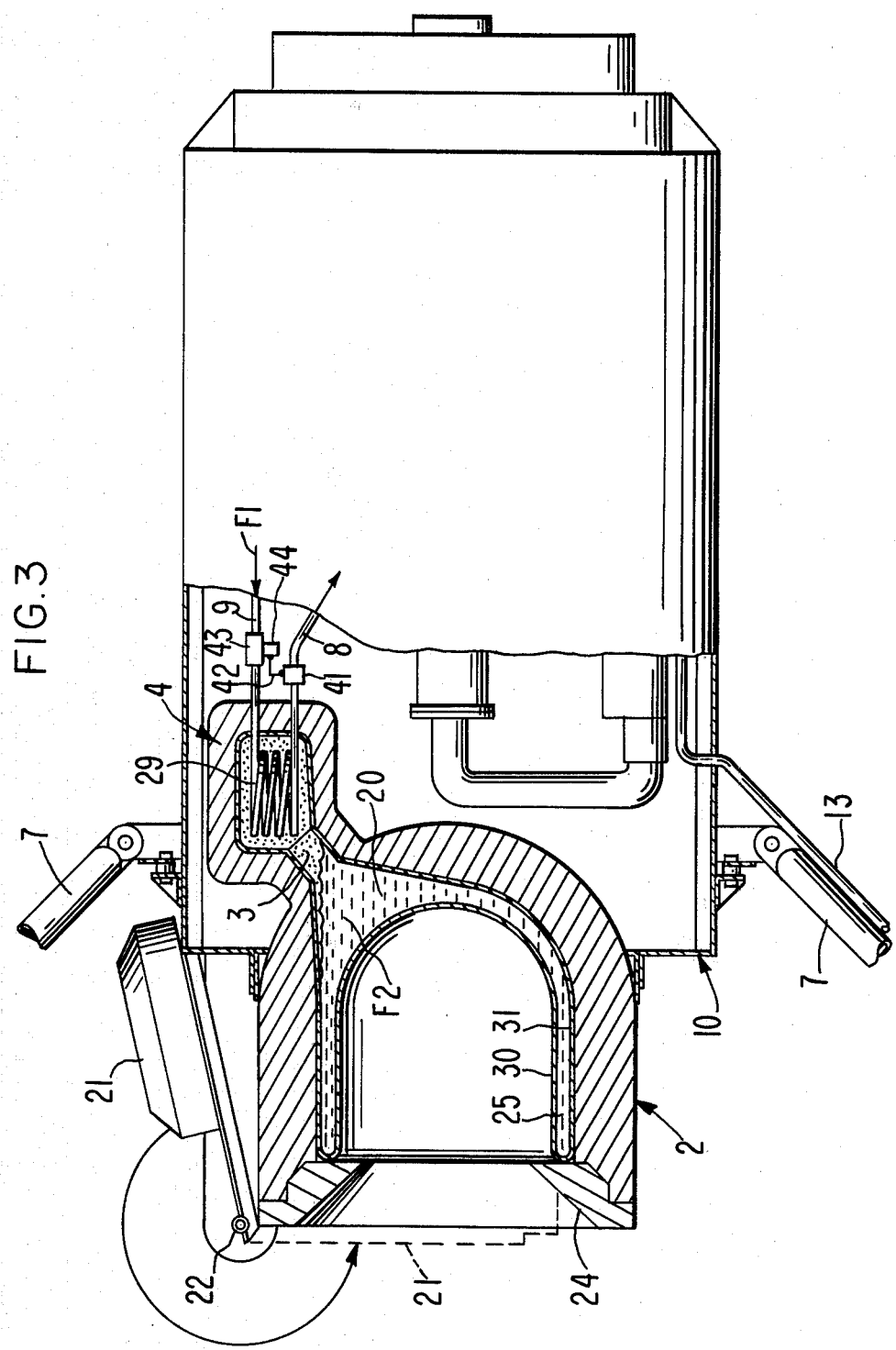
FIG. 3 is a cross-sectional side view of the present invention taken along the view 3—3 of FIG. 2.

In FIG. 3, it can be more clearly seen that solar receiver 2 is connected via vapor pipe 3 to heat exchanger 4 which is in turn connected via inlet pipe 9 and outlet pipe 8 to heat extracting means 10 which may be, for example, a heat engine having a generator, which converts the heat energy to rotational mechanical energy and thence to electricity. The electricity is drawn from engine 10 by conventional means such as cable 13 for distribution to power grid 14. (See FIG. 1).

Vapor pipe 3 is situated at the upper portion of the closed end (i.e., the end not facing concentrator 6) of receiver 2 and is normally connected at an angle with respect to the horizontal axis of receiver 2 so as to provide an unobstructed path for vapor which accumulates in dome section 20 of receiver core 25 to rise through vapor pipe 3 to heat exchanger 4, and to provide an unobstructed path to permit gravity-assisted return of secondary fluid condensate back to receiver 2, regardless of the orientation of receiver 2 with respect to the earth's horizon. Dome section 20 is an enlarged region of core 25 located at the upper nonconcentrator end of receiver 2 and provides a large liquid-to-vapor interface area which reduces fluid flow velocity at this interface.

Core 25 of receiver 2 is a sealed container formed of two concentric cylinders joined at the aperture end of receiver 2 (i.e., the end facing parabolic dish 6) in a half toroid and at vapor pipe 3 end in the form of two half spheres cut by the dome-shaped section 20 by means of which vapor pipe 3 joins core 25. A hollow annular core region 25 is thus formed between the two ends of receiver 2. Core 25, the interior of vapor dome section 20, vapor pipe 3, and heat exchanger 4 constitute a sealed containment vessel for the secondary fluid. Lips 24 are located circumferentially around the aperture of receiver 2 as shown in the drawings.

The horizontal position of receiver 2 shown in FIG. 3 corresponds to a position wherein dish 6 is tracking sun 12 at the horizon, i.e., zero degree elevation. As dish 6 rotates through its full 90° elevation arc as it tracks sun 12 to a full overhead position in the sky, vapor pipe 3 always remains situated above receiver core 25 and heat exchanger 4 always remains situated above vapor pipe 3. The preferred angle between vapor pipe 3 and the earth's horizon is between 10° and 90° inclusively. Thus, for the case where dish 6 is capable of a full 90° of elevation tracking, pipe 3 should make an angle of between 10° and 80° inclusively with respect to the horizontal axis of receiver 2. Assuming this latter angle is 10°, when dish 6 is in a full upright position (elevation angle equals 90°), vapor pipe 3 then makes an angle of 80° with respect to the horizon. When dish 6 is in a horizontal position (elevation angle zero degrees), vapor pipe 3 then makes an angle of 10° with respect to the horizon. If dish 6 is not capable of tracking the lower 10° of elevation, then pipe 3 can make an angle of between 0° and 80° inclusively with respect to the horizontal axis of receiver 2.

Figure 2:
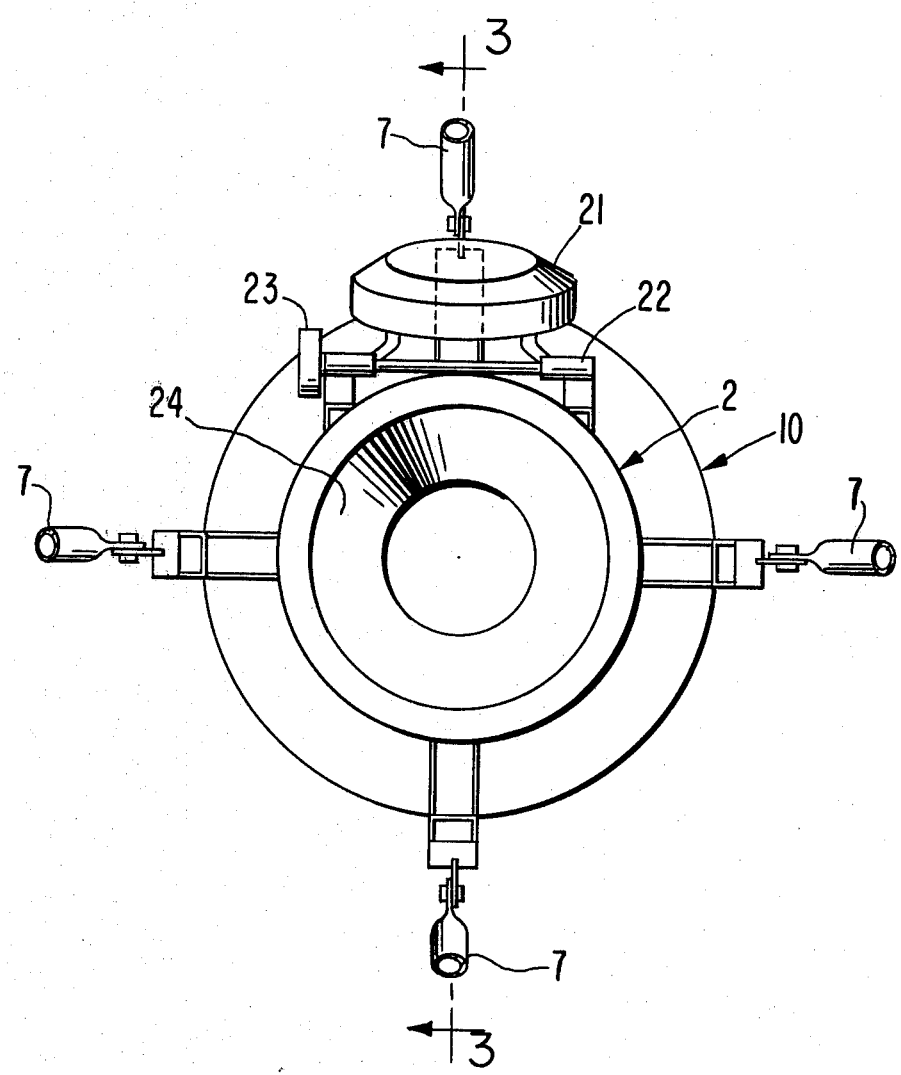
FIG. 2 is an end view of the present invention viewed from the solar receiver end.

Cavity door 21 is a movable door; when in its position covering the aperture to receiver 2, it prevents the heat within receiver 2 from escaping, thereby reducing energy losses during cloudy days and at night. Door 21 is perferably pivotally mounted about pivot 22 (see FIG. 2). When door 21 is swung open as shown in the drawings, it presents a low profile to the sun's rays, minimizing energy loss. A motor 23 is mounted at one end of pivot 22 to provide power to swing the door open or shut as necessary. Motor 23 can be actuated by light sensing means such as a photo-conductor which provides an electrical current that automatically activates the motor to open or shut door 21 based upon a certain predetermined threshold of light radiation emanating from sun 12.

One purpose of door 21 and the major purpose of lips 24 of receiver 2 is to protect receiver 2 and associated apparatus from impingement of solar radiation when the concentrated solar beam is not centered on the aperture of receiver 2. Consequently, door 21 and lips 24 are fabricated of extremely high heat resistant materials such as ceramics, e.g., silicon carbide, silicon nitride, or boron nitride; or carbon or graphite composite materials. The outer surfaces of receiver 2, vapor pipe 3, and heat exchanger 4 other than lips 24 and door 21 are covered with effective heat insulation materials such as alumina-silica blankets or graphite composite.

Inner wall 30 and outer wall 31 of core 25 are fabricated of a material which is strong, thin, is a good heat conductor and is able to withstand high temperatures. In addition, if the fluid employed for the secondary fluid (the fluid within core 25) is corrosive, then the material for walls 30 and 31 must be able to withstand corrosion; in such a case, stainless steel is a good selection. Other choices include steel, E-Brite (TM), and Alonized (TM) steel. This same material selected for walls 30 and 31 can be used for all the supporting structure of receiver 2, vapor pipe 3, and heat exchanger 4.

Interior wall 30 can be wicked along its entire interior surface (i.e., the surface within core region 25) to facilitate the wetting of the surface as necessary to prevent localized burn-out which can occur if the local fluid heat transfer rate is substantially less than the local solar flux. In this circumstance, the wall temperature can rise to the melt point, with subsequent destruction of the surface.

Within core 25 is the secondary fluid (F2) in liquid form; in vapor dome section 20, the liquid partially changes into a vapor, i.e., gaseous, state by virtue of the intense heat conducted into core 25 through wall 30 as a result of the concentrated solar radiation which enters through the aperture of receiver 2. The heat then travels with the rising vapor upwards through vapor pipe 3 into heat exchanger 4.

The interior surface of pipe 3 may be wicked to facilitate the return of F2 condensate back to core 25 particularly at low gravity gradients (low angles of the vapor pipe with respect to the horizon) and/or at low F2 vapor pressure. An optional valve (not illustrated) may be installed within vapor pipe 3 to stop the flow of vapor to heat exchanger 4, and thus stop the flow of heat to heat extractor 10 under certain conditions, e.g., when a preestablished maximum or minimum temperature of fluid F2 has been reached. A switch which closes the valve can signal this information via a thermocouple. Heat extractor 10 can be shut down upon the occurrence of these same conditions.

Within heat exchanger 4, vapor F2 encounters the cooler primary fluid (F1) flowing within heat exchange element 29, which is an element such as a coil having a high surface area per unit volume and whose function is to provide the heat exchange. Along the outer surface of element 29, vapor F2 condenses; the condensate flows downward by force of gravity back through vapor pipe 3 into vapor dome 20 and into core 25.

Vapor F2 gives up heat to fluid F1 according to F2's latent heat of vaporization. Fluid F1 is pumped or otherwise flows through the system comprising element 29, outlet pipe 8, into heat extractor 10, and back through inlet pipe 9 into element 29.

It is desirable to remove heat from heat exchanger 4 at the same rate that heat enters receiver 2 to maintain system temperature, to heighten efficiency, and for reasons of safety. This can be accomplished by ensuring that the temperature of F1 stays at a substantially constant level corresponding to the preselected optimum operating temperature of the system. FIG. 3 illustrates how this can be accomplished. Temperature sensing means 41, which can be a thermocouple, is placed within outlet pipe 8 at a point between heat exchanger 4 and heat extractor 10. Thermocouple 41 produces on wire 42 an electrical voltage proportional to the amount by which the temperature of F1 exceeds the set point of thermocouple 41, which has been preset to the desired operating temperature of the system. Wire 42 is connected to variable speed motor 44 which in turn drives variable speed pump 43 inserted in inlet pipe 9 between heat exchanger 4 and heat extractor 10. An increasing voltage on wire 42 causes motor 44 to speed up which causes F1 to flow faster, thereby lowering the temperature of F1. The system thereby self-corrects to the desired operating temperature. Alternative to the use of a variable speed pump, pump 43 can be a fixed speed pump, in which case a flow control valve (not illustrated) is inserted in inlet pipe 9 between heat exchanger 4 and pump 43. In this case, wire 42 is connected to the valve, which admits a greater F1 flow as the voltage on wire 42 increases, thus cooling F1.

Heat extractor 10 is any device which processes the heated fluid, such as a heat engine, e.g., Rankine, Stirling or Brayton cycle engine, which generates rotational mechanical energy from the heat applied to the engine via outlet pipe 8. The mechanical energy can then be converted into electrical energy e.g., by means of a generator as is conventionally known. Alternatively, heat extractor 10 may be an industrial process heat application.

The primary fluid is selected to optimize the performance of extractor 10. For a Rankine cycle engine, fluid F1 is typically toluene, with an upper temperature limit of approximately 427° C. (800° F.). For a Brayton cycle engine, fluid F1 is a gas such as air with a maximum temperature of 816° C. (1500° F.) for a metal engine and about 1371° C. (2500° F.) for a ceramic engine. For a Stirling cycle engine, primary fluid F1 is a gas with a low molecular weight such as hydrogen or helium, operating at temperatures similar to those of the Brayton cycle engine.

The choice of the secondary fluid is not strongly dependent on the choice of primary fluid. It is of no concern whether the primary fluid undergoes a phase change or not, but it is essential to the working of the invention that the secondary fluid undergoes a phase change. The following are the criteria for selecting the secondary fluid:

(1) it should have low vapor pressure at the system operating conditions;
(2) its critical point should be above the maximum operating conditions of the primary fluid;
(3) it should have high heat transfer capability when boiling;
(4) it should have a high burnout heat flux;
(5) it should exhibit stable pool boiling over a wide range of operating conditions;
(6) it should be non-corrosive, non-toxic, non-flammable, and chemically stable;
(7) it should be easy to handle and to fill and drain the receiver;
(8) its freeze point should be below the ambient system conditions;
(9) it should have a high heat capacity per unit volume; and
(10) it should be inexpensive.

Acceptable choices for the secondary fluid are: For medium temperature applications (up to 427° C.):

(1) Terphenyls, including the meta-, para-, and ortho-terphenyls or mixtures thereof; these have the advantage of being noncorrosive; however, they start to degrade substantially at temperatures above approximately 427° C. (800° F.). The vapor pressure of terphenyl is about two atmospheres at the same operating temperatures.
(2) Sulfur, which may be used for higher temperatures. A major problem with sulfur is that it is corrosive. Its vapor pressure is approximately one atmosphere at 427° C. (800° F.).
(3) Sulfur with additives such as iodine or bromine which change the molecular structure to keep the viscosity of the fluid low.
(4) Aluminum bromide or other salts.

For high temperature applications (above approximately 600° C.):

(1) Liquid metals, e.g., sodium and potassium, which have a vapor pressure of approximately one-half atmosphere at 816° C.
(2) Salts.

If the secondary fluid is sulfur, the material for core walls 30 and 31 may be aluminized steel, which is less expensive than stainless steel. If the secondary fluid is terphenyl, walls 30 and 31 may be fabricated of ordinary steel.

EXAMPLE 1

Heat extractor 10 is a Rankine engine; F1 is toluene. This is a medium temperature application. F2 is sulfur with iodine or bromine added. Core walls 30 and 31 as well as other structural components of receiver 2, vapor pipe 3, and heat exchanger 4 are fabricated of Alonized (TM) steel. Door 21 and lips 24 are fabricated of silicon carbide. The remaining outer surfaces of receiver 2, vapor pipe 3, and heat exchanger 4 are insulated with an alumina-silica blanket.

EXAMPLE 2

Heat extractor 10 is a Stirling cycle engine employing helium as the primary fluid, or a Brayton cycle engine employing air as the primary fluid. The system operates at 816° C. (high temperature). The secondary fluid is liquid sodium. Walls 30 and 31 are stainless steel. Door 21 and lips 24 are silicon carbide. Remaining portions of receiver 2, vapor pipe 3, and heat exchanger 4 are stainless steel covered with aluminum-silica insulation.

The invention has the following distinct advantages over the conventional direct heating methods:

To a large extent each of the fluids F1 and F2 can be optimized independently from each other. For example, it might be necessary that fluid F1 be under high pressure in order to drive a particular type of engine.

The fact that the secondary fluid changes state from a liquid to a gas makes for a very efficient system compared with a single-phase free (or forced) convection type of system in which the secondary fluid remains a liquid. Thus, the size, weight and cost of the system can be minimized because small heat transfer surface areas are acceptable at both the solar concentrator and heat exchanger ends of the system. Excessive wall temperature or burnout is virtually eliminated during operating conditions for both the core walls 30 and 31 and heat exchanger 4 walls.

Because of the separation of the fluids, the design of receiver 2 is relatively insensitive to the choice of primary fluid. The mechanical structure of the system is simple. The system is inherently safe due to the low operating pressures (typically, the fluid pressure of the secondary fluid, which is equal to its vapor pressure, is approximately one atmosphere, but since its containment vessel is sealed, this pressure may vary). The liquid portion of F2 plus door 21 forms an inherent heat buffer which stores heat during periods of inclement weather.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An internal cavity solar power converter comprising:
   a solar receiver formed between two concentric, generally cylindrical sleeves, said receiver substantially filled with a pool of secondary fluid which changes phase from a liquid to a vapor upon the impingement of solar radiation thereon;
   an annular seal connecting said sleeves at a first end thereof;
   a fixed aperture formed by said annular seal and disposed to permit concentrated solar radiation to impinge upon an interior surface of said receiver; and
   a heat exchanger coupled to an end of said receiver opposite its apertured end, having a first chamber adapted to receive secondary fluid from said solar receiver, said exchanger further having a second chamber containing a primary fluid;
   wherein said secondary fluid undergoes a phase change from a vapor to a liquid as it gives up heat to said primary fluid within said heat exchanger.

2. The apparatus of claim 1 further comprising the additional element of a vapor pipe connected to said solar receiver and to said heat exchanger, said pipe providing a path for the vapor form of said secondary fluid to flow from said receiver into said heat exchanger, and for the liquid form of said secondary fluid to flow from said heat exchanger into said receiver.

3. The apparatus of claim 2 wherein said vapor pipe is connected to said solar receiver at an angle with respect to the horizontal plane of said receiver, and the horizontal plane of the receiver is oriented with respect to the earth's horizon, in such a way that the secondary fluid in vapor form is free to rise up through said vapor pipe into said heat exchanger when said secondary fluid is heated, and said secondary fluid in liquid form is free to fall by gravity from said heat exchanger through said vapor pipe into said receiver when said secondary fluid is cooled.

4. The apparatus of claim 3 wherein said vapor pipe makes an angle of between 10° and 80°, inclusively, with respect to the horizontal plane of said solar receiver.

5. The apparatus of claim 1 further comprising the additional element of heat extracting means connected to said second chamber at an inlet and an outlet thereof.

6. The apparatus of claim 5 wherein said heat extracting means is from the class consisting essentially of heat engines and process heat applications.

7. The apparatus of claim 6 further comprising the additional element of a movable door affixed to said receiver and disposed to move so that it alternatively blocks and keeps open the aperture to said receiver, said blocking made to occur during periods when solar flux is not substantially present.

8. The apparatus of claim 7 wherein said heat extracting means is a Rankine cycle heat engine;
   said primary fluid is toluene;
   said secondary fluid is sulphur with iodine or bromine additives;
   said receiver and heat exchanger are fabricated of steel;
   said door and the region surrounding the opening of said receiver are fabricated of silicon carbide; and
   the outer surfaces of said heat exchanger, and the outer surfaces of said receiver other than said door and said region surrounding said opening, are insulated with an alumina-silica blanket.

9. The apparatus of claim 7 wherein said heat extracting means is a Stirling cycle heat engine and said primary fluid is helium;
   said secondary fluid is liquid sodium;
   said solar receiver and said heat exchanger are fabricated of stainless steel;
   said door is fabricated of silicon carbide; and
   said solar receiver and heat exchanger are covered with aluminum-silica insulation.

10. Apparatus of claim 1 further comprising the additional element of temperature regulating means connected to said heat exchange element for maintaining the temperature of said primary fluid substantially constant.

* * * * *